United States Patent [19]

Takanashi et al.

[11] 4,347,529
[45] Aug. 31, 1982

[54] COLOR-RESOLVING STRIPED FILTER FOR CAMERA TUBE

[75] Inventors: Itsuo Takanashi; Shintaro Nakagaki; Tadayoshi Miyoshi, all of Yokohama; Koichiro Motoyama, Ninomiya-Machi; Kenichi Miyazaki, Sagamihara; Sumio Yokokawa, Yokohama, all of Japan

[73] Assignee: Victor Company of Japan, Ltd., Yokohama, Japan

[21] Appl. No.: 137,417

[22] Filed: Apr. 4, 1980

[30] Foreign Application Priority Data

Apr. 4, 1979 [JP] Japan .................................. 54-40471

[51] Int. Cl.³ ............................................. H04N 9/07
[52] U.S. Cl. ..................................................... 358/44
[58] Field of Search .......................................... 358/44

[56] References Cited

U.S. PATENT DOCUMENTS 3,715,461 2/1973 Hanlon ................................. 358/44
3,935,588 1/1976 Uno ....................................... 358/44

*Primary Examiner*—Richard Murray
*Attorney, Agent, or Firm*—Louis Bernat

[57] ABSTRACT

A color-resolving striped filter used for a camera tube comprises a plurality of groups of filter stripes. The groups are disposed in parallel and consecutively in a sequentially repeated arrangement. Each of the groups comprises six filter strips from among, a first filter stripe having a light transmission characteristic for transmitting the light of one of the three primary colors of an addition mixture color, a second filter stripe having a light transmission characteristic for transmitting the light of a mixed color which includes the primary color transmitted through said first filter stripe and one of the other two primary colors, a transparent third filter stripe for transmitting white light, and three fourth filter stripes each of which is disposed between and adjacent to the first, second, and third filter stripes. The six filter stripes of each group are arranged in parallel and consecutively in a specific sequence.

5 Claims, 6 Drawing Figures

COLOR-RESOLVING STRIPED FILTER FOR CAMERA TUBE

BACKGROUND OF THE INVENTION

The present invention relates generally to color-resolving striped filters provided on camera tubes, and more particularly to a color-resolving striped filter having an organization for deriving an output signal having large S/N ratio from a camera tube.

Among the simple types of known color television cameras, there is a so-called single-tube type in which a single pickup or camera tube, having a color-resolving striped filter in its optical system, is used to generate luminance signals and color signals. Also, a color television camera has two tubes in one pickup or camera tube. One tube is used for generating luminance signals, and the other tube has a color-resolving striped filter within its optical system to generate color signals.

In either type of the above mentioned color television cameras, the color-resolving striped filters are of the phase-separation or the frequency-separation system.

In a color-resolving striped filter of the phase-separation type, however, there has been the disadvantageous requirement that the color-resolving striped filter have a complicated organization, including index stripes. Another disadvantageous requirement is that a complicated organization has been required for generating sampling pulses on the basis of information obtained from these index stripes. A further problem is that noise results in the conversion of color information signals by a "sampling hold" of a dot-sequential system. In this system, a signal is obtained by sampling and inadvertently introducing noise of high frequency into simultaneous color information signals included in the dot-sequential. The color information signals become stretched along the time axis and are converted into noise of conspicuously low frequency, whereby the signal-to-noise ratio becomes low.

A color-resolving striped filter of the frequency-separation system does not encounter the above described difficulties accompanying a known color-resolving striped filter of the phase-separation system. However, there are interference fringes (moire), due to various causes, since two sheets of striped filters of different space frequency values are fabricated in combination. In addition, the frequency fluctuation of a carrier wave generated in the output signal, as a result of non-linearity of the deflection system of the camera tube, is a large problem. Often, there are further difficulties, such as shading due to a difference in degrees of modulation, at the peripheral region and the central region in the target surface of the camera tube.

The present applicant has previously developed a novel "Color television signal generating apparatus" which overcomes the above described disadvantages by U.S. Pat. No. 4,041,528. This previously developed color television signal generating apparatus comprises a color-resolving striped filter, in a camera tube, for separating the output signal of the camera tube into required signals. Detecting means detects the envelopes of specific positive wave and negative wave signals thus separated. The output of the camera tube is a superimposed signal of a direct wave signal containing signals of three primary colors, of additional mixed colors, and a high-band component signal comprising a group of modulated color signals. This camera output signal results from the amplitude modulation of a carrier wave responsive to filter stripes in the color-resolving striped filter. The carrier wave components have a higher harmonic relation relative to two primary color signals. The separating means comprises first separating means for separating the direct signal from the above mentioned superimposed signal and second separating means for separating the high-band component signal. The envelope detecting means comprises a first detector for producing a demodulated output signal in accordance with an envelope resulting from a successive connection of peak values of the positive wave of the thus separated high-band component signal. A second envelope detection means produces a demodulated output signal in accordance with an envelope resulting from a successive connection of peak values of the negative wave of the thus separated high-band component signal.

A color-resolving striped filter comprises a plurality of groups of filter stripes. The groups are disposed in parallel and consecutively in a sequentially repeated arrangement. Each of the groups comprises at least three filter stripes from among, a first filter stripe having a light transmission characteristics for transmitting the light of one of the three primary colors of an addition mixture color, a second filter stripe having a light transmission characteristic for transmitting the light of a mixed color which includes the primary color transmitted through the first filter stripe and one of the other two primary colors, and a transparent third filter stripe for transmitting white light. The at least three filter stripes are arranged in parallel and consecutively in a specific sequence.

The apparatus described above has the following advantageous features.

Since a filter comprising filter stripes of respectively equal space frequency are used for the color-resolving striped filter, moire does not occur. Since the system is not a phase separation system, stripes are not necessary for generating index pulses in the color-resolving striped filter, the camera tube, and other parts. Therefore, the color-resolving striped filter and the camera tube become simple and can be readily fabricated. Furthermore, since the rate of utilization of the incident light is improved, high sensitivity is obtained. By adjusting the spectral response characteristics of the filter stripes of the color-resolving striped filter and the spectral response characteristic of the camera tube, the output levels of the three primary color signals respectively become equal when there is a pick up of an all-color light (white light). It is easy to reduce the shading which is due to the modulation degree characteristic of the camera tube. The positive and the negative waves of the high-band component signal are, respectively, envelope detected to obtain two 2-color mixture signals. Thus, it is possible to provide a color television signal generating apparatus with an excellent performance, which is simple and can be produced at low cost. Since a vertical correlation is not utilized, a spurious color signal (interference signal) is not generated corresponding to boundaries of patterns. Further, a vertical resolution is not lowered.

Then, in the above mentioned color television signal generating apparatus in which a color-resolving striped filter is used, a fundamental wave component signal and a second harmonic component signal are necessary when three primary color signals (that is, color demodulation) are generated, as described hereinafter. However, the S/N ratio of three primary color signals is determined by the noise component existing in respective bands. Accordingly, in the above mentioned color television signal generating apparatus, there has been a problem in that the S/N ratio of the three primary color signal is not very good because of the effect of the noise component within particularly the second harmonic component signal band.

SUMMARY OF THE INVENTION

Accordingly, it is a general object of the present invention to provide a novel and useful color-resolving striped filter for a camera tube in which the above described difficulties and problems are overcome and solved.

Another and specific object of the invention is to provide a color-resolving striped filter of an arrangement wherein a fourth filter stripe is disposed between the first, second, and third filter stripes of the color-resolving striped filter used in the above mentioned color television signal generating apparatus which has been previously developed. More in detail, the color-resolving striped filter of the present invention comprises a plurality of groups of filter stripes. The groups are disposed in parallel and consecutively in a sequentially repeated arrangement. Each of the groups comprises at least four filter stripes from among a first filter stripe having a light transmission characteristics for transmitting the light of one of the three primary colors of an addition mixture color, a second filter stripe having a light transmission characteristic for transmitting the light of a mixed color which includes the primary color transmitted through the first filter stripe and one of the other two primary colors, a transparent third filter stripe for transmitting white light, and fourth filter stripes each of which is disposed between and adjacent to the first, second, and third filter stripes. Those filter stripes being arranged in parallel and consecutively in a specific sequence. In the operation of the color-resolving striped filter according to the invention, the amplitude of the second harmonic component signal used for the three primary color signal generation (color demodulation) in the higher harmonic component signals in the output signal of the camera tube can be made large relative to the fundamental wave component signal. Therefore, an output of three primary color signals, with a large S/N ratio, can be obtained from the camera tube.

Other objects and further features of the present invention will be apparent from the following detailed description with respect to preferred embodiments of the invention when read in conjunction with the accompanying drawings.

DETAILED DESCRIPTION

Figure 1:
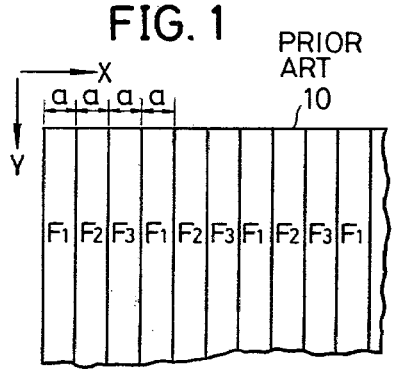
FIG. 1 is an enlarged, fragmentary frontal view of one example of a color-resolving striped filter previously developed.

One example of a color-resolving striped filter previously developed is illustrated in FIG. 1. The color-resolving striped filter 10 is made up of first, second, and third filter stripes F1, F2, and F3 of equal widths a. Each stripe has an oblong, narrow shape in the vertical direction. The stripes are laid consecutively and contiguously in the order named above, stripes F1, F2, and F3 constituting one group. A plurality of such groups are laid consecutively and contiguously side-by-side in a single place. These filter stripes F1, F2 and F3, of all groups, extend in the direction (direction Y in FIG. 1) which is perpendicular to the horizontal scanning direction (direction X in FIG. 1). The stripes are arrayed in an orderly manner in the above mentioned sequence, and all filter stripes have the same space frequency.

The light transmitting characteristics respectively of these filter stripes F1, F2 and F3 are as follows. The first filter stripe F1 is adapted to transmit light of one primary color from among the three primary colors (red, green, and blue) of addition mixed colors. The second filter stripe F2 is adapted to transmit light of mixed colors of the primary color transmitted through the first filter stripe and one of the two remaining primary colors (i.e. not the primary color transmitted through the first filter stripe). The third filter stripe F3 is adapted to transmit the light of all colors (e.g. white light).

More specifically, the second filter stripe F2 is capable of transmitting light of colors respectively having the following relationships, depending on whether the primary color transmitted through the first filter stripe F1 is red, green or blue.

| Primary color light transmitted through first filter stripe F1 | Color of light transmitted through second filter stripe F2 |
| --- | --- |
| red light | magenta (red blue) or yellow (red green) |
| green light | yellow (red green) or cyan (blue green) |
| blue light | magenta (red blue) or cyan (blue green) |

In one example of a color-resolving striped filter 10 of the above described organization, the first filter stripe F1 is adapted to have a transmission characteristic to transmit green light (G). The second filter stripe F2 is adapted to have a transmission characteristic to transmit the light of a mixture color of blue light (B) and green light (G) (that is, cyan (C)). The third filter stripe F3 is adapted to have a transmission characteristic to transmit the light of all colors, that is, white light (W) or a mixed color light of red light (R), green light (G), and blue light (B).

Figure 2:
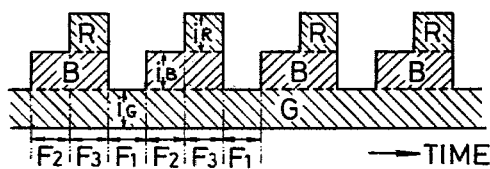
FIG. 2 is a diagram indicating the energy distribution of transmitted light when white light is projected onto the color-resolving striped filter shown in FIG. 1.

If these filter stripes F1, F2, and F3 have such light transmitting characteristics, the energy state of the light transmitted when a white light (W) is projected onto the color-resolving striped filter 10 is as illustrated by one example in FIG. 2, in which the horizontal direction (X-axis direction) represents energy distribution. That is, green light (G) is continuously distributed since it is transmitted through all filter stripes F1, F2, and F3. Blue light (B) is distributed over a width 2a separated by space intervals a, since it only passes through the filter stripes F2 and F3. Red light (R) is distributed over a width a separated by space intervals of 2a since it is only transmitted through the filter stripe F3.

A color television signal generating apparatus previously developed, in which the above described color-resolving striped filter 10 is used will now be described with respect to one example thereof and with reference to FIG. 3. This color-resolving striped filter and the previously developed color television signal generating apparatus are described in detail in the specification of U.S. Pat. No. 4,041,528.

Figure 3:
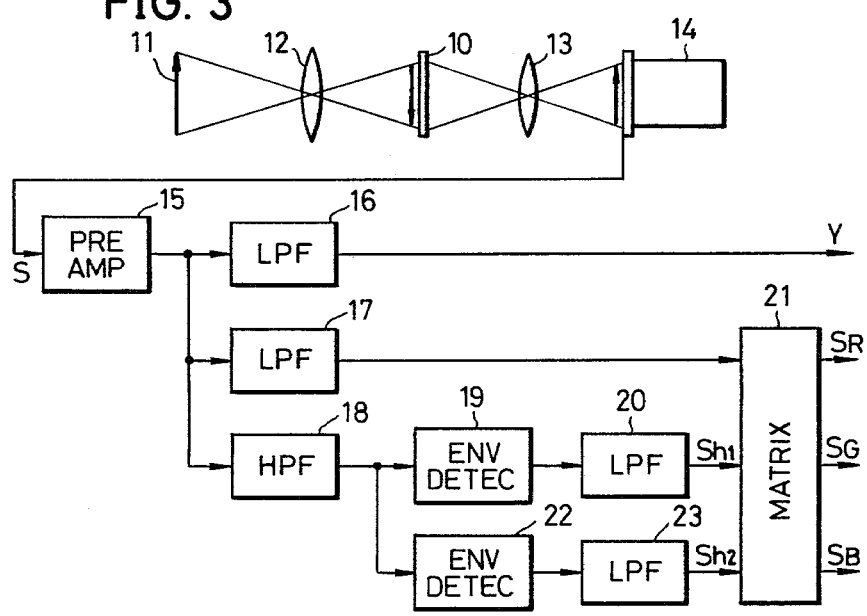
FIG. 3 is a combined optical and block diagram illustrating one embodiment of a previously developed color television signal generating apparatus.

In the apparatus diagrammatically represented in FIG. 3, the image light from an object 11 to be televised passes through the camera lens 12 of a single tube type color television camera and forms an image on the color-resolving striped filter 10. The optical image thus formed on this filter 10 is transmitted by way of a relay lens 13 and forms an image on the photoconductive surface (or photoelectric surface) of a camera tube 14.

When a color-resolving, striped filter 10 of the characteristic indicated in FIG. 2 is used, and a white light image is introduced as incident light passing through the camera lens 12, the resulting output signal S obtained from the camera tube 14.

The output signal S is also represented as:

$$S = Sd + Sh \qquad (1)$$

where the signal Sd is a direct wave (DC component) signal comprising a mixture of a luminance signal Y, a green light signal SG, a blue light signal SB, and red light signal SR.

The signal Sh is a high-band component (AC component) signal comprising a group of modulated color signals having forms resulting from amplitude modulation of a specific carrier wave and other carrier waves with a mixture signal. The specific carrier wave has a frequency which is the same as the space frequency determined by the number of groups of filter stripes F1, F2 and F3 of the color-resolving striped filter 10. The other carrier waves have frequencies which are the same as higher harmonics of the specific carrier wave. The mixture signal is made up of two primary colors other than the primary (which is green color light in the instant example) passing through the first filter stripe F1.

The above mentioned output signal S of the camera tube 14 is amplified by a preamplifier 15. Then, it is supplied to low-pass filters 16 and 17 and a high-pass filter 18. The low-pass filter 16 has a filtering characteristic shown by curve I, which is an upper-limit cut-off frequency fy of approximately 2.5 MHz. A luminance signal Y is derived from the output signal of filter 16 (curve I). The low-pass filter 17 has a filtering characteristic shown by curve II, with an upper-limit cut-off frequency fc of approximately 0.5 MHz, from which the above mentioned direct signal Sd is derived. The high-pass filter 18 has a filtering characteristic shown by curve III with a lower-limit cut-off frequency fh. The above mentioned high-band component signal Sh shown by characteristic curves IV$_1$ and IV$_2$ is derived from the signal of curve III.

Figure 4:
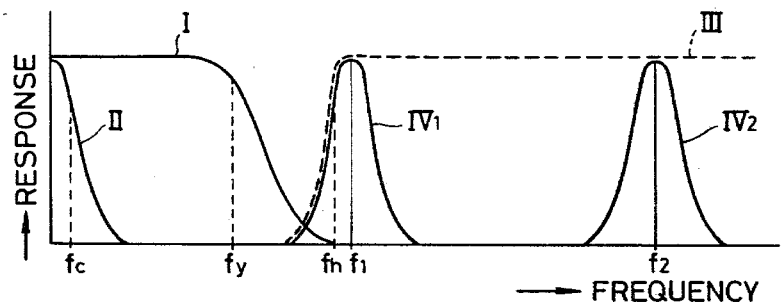
FIG. 4 is a graphical representation indicating the frequency responses of the output signal of a camera tube and the filtering characteristic of a filter in the apparatus shown in FIG. 3.

In FIG. 4, frequency f1 indicates a carrier wave of a frequency which is determined by the number and space frequency of filter stripe groups of the color-resolving striped filter 10, this frequency being approximately 3.25 MHz, for example, when there are 170 groups of the filter stripes. The frequency f2 indicates the second harmonics (of approximately 6.5 MHz) of the carrier wave of the above mentioned frequency f1.

If a color-resolving striped filter having the characteristic indicated in FIG. 2 is used, only a modulated color signal having a component of the signal SB due to blue light B and a modulated color signal having a component of the signal SR due to red light R exist in the signal Sh. A signal component due to green light G is not contained therein.

The high-band component signal Sh which has been derived from the high-pass filter 18 is supplied respectively to an upper side envelope detector circuit 19 and a lower side envelope detector circuit 22, where the positive wave and negative wave, respectively, are envelope detected. The output demodulated signals of the envelope detector circuits 19 and 22 are supplied to a matrix circuit 21 by way of low-pass filters 20 and 23, as signals Sh1 and Sh2. The matrix circuit 21 receives these signals Sh1 and Sh2 together with the direct-wave signal Sd from the low-pass filter 17. As a result, the matrix circuit 21 produces three primary color output signals SG, SR, and SB for green, red, and blue, and carries out color demodulation.

The output signal S1 of the preamplifier 15 is represented by the following equation.

$$S_1 = (i_G + \tfrac{2}{3} i_B + \tfrac{1}{3} i_R) + A\sin(\omega t + \phi) + \tfrac{4}{2} \sin(2\omega t - \phi) + \qquad (2)$$

where $$\begin{cases} A = -\dfrac{\sqrt{3}}{\pi} (i_B^2 + i_B i_R + i_R^2)^{\frac{1}{2}} \\ \phi = \tan^{-1} \dfrac{i_B - i_R}{\sqrt{3}\,(i_B + i_R)} \\ \omega = 2\pi f1 \text{ (where } f1 \text{ is a space frequency determined by three filter stripes } F1, F2, F3 \text{ of the color-resolving striped filter 10.)} \end{cases}$$

The waveform of the output signal S$_1$ of the preamplifier 15 with the characteristic of the degree of modulation of the camera tube in the ideal state of 100 percent for all frequencies becomes as shown in FIG. 2, and the levels become i$_G$ for the filter stripe F1, i$_G$+i$_B$ for the filter stripe F2, and i$_G$+i$_B$+i$_R$ for the filter stripe F3. These levels i$_G$, i$_B$, and i$_R$ correspond to the necessary three primary color signals.

From comparing the equations (1) and (2), the following equation is derived.

$$Sd = (i_G + \tfrac{2}{3} i_B + \tfrac{1}{3} i_R).$$

The specific carrier wave has a frequency which is the same as the space frequency determined by the number of groups of filter stripes F1, F2 and F3 of the color-resolving striped filter 10. The other carrier wave has frequency which is the same as second harmonic of the specific carrier wave. The mixture signal is made up of two primary colors other than the primary (which is green color light in the instant example) passing through the first filter stripe F1. Since the signal, in which the carrier wave having a frequency the same as third harmonic frequency of the specific carrier wave is amplitude modulated, is unnecessary for color demodulation, this signal is omitted in expression in the following equation.

$$Sh = A \sin(\omega t + \phi) + (A/2) \sin(2\omega t - 100) \quad (3)$$

Then, when the noise component within the fundamental harmonic component signal band is denoted by n1, and the noise component within the second harmonic component signal band is denoted by n2, the total noise N after the above mentioned envelope detection is expressed by the mean square of the noise components n1 and n2 and is governed by that noise component, of these noise components n1 and n2, which is of the higher level. However, the preamplifier (15), in general, has a so-called triangular noise characteristic wherein, as the frequency increases, the level of the noise also increases. For this reason, the noise component n2 is greater than n1, and, in the total noise N, the noise component n2 is predominant.

Accordingly, in order to improve the S/N ratio of the output signal, it is necessary to suppress the noise component n2. For this, the use of a preamplifier of the Percival type having a resonance point in the vicinity of the carrier wave frequency of the second harmonic component signal for the preamplifier 15 is conceivable. By this measure, the level of the noise component n2 can be reduced below the level of the noise component n1, but even then, this reduction is merely of the order of 3 dB. However, when the degree of modulation of the camera tube is considered, the level of the second harmonic component signal is lower by a difference of the order of approximately 5 dB relative to the level of the fundamental harmonic component signal. Consequently, as a resultant characteristic, the level of the noise component n2 is still approximately 2 dB higher than that of the noise component n1. Therefore, even if a preamplifier of the Percival type is used for the purpose of obtaining a three primary color signals by means of the circuit shown in FIG. 3 by using the above mentioned color-resolving striped filter previously developed and illustrated in FIG. 1, there has been a problem in that an output three primary color signals of good S/N ratio could not be obtained.

The present invention, which provides a novel color-resolving striped filter in which this problem has been solved, will now be described in conjunction with FIGS. 5 and 6.

Figure 5:
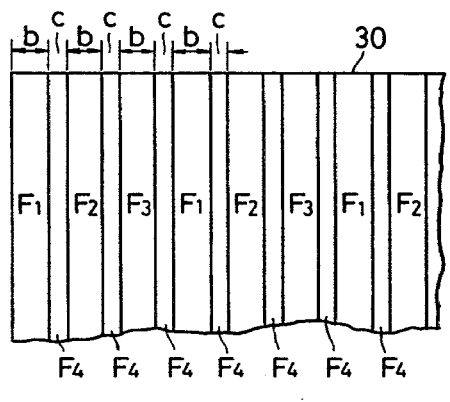
FIG. 5 is an enlarged, fragmentary frontal view of one embodiment of a color-resolving striped filter according to the present invention.

In FIG. 5, the color-resolving striped filter 30 comprises a series of sets each of first, second, and third filter stripes F1, F2, and F3, which have a width b each and are vertically narrow and long, in parallel, spaced-apart arrangement with a fourth filter stripe F4 of a width c interposed between adjacent filter stripes F1, F2, and F3. Thus, each set comprises filter stripes F1, F4, F2, F4, F3, and F4 in the sequence named. The sum of the widths b and c of these filter stripes is so selected that it will be equal to the width a of the filter stripe of the color-resolving striped filter 10. For example, the width b is 20 μm, and the width c is 3 μm.

The light-transmitting characteristics of the above mentioned first, second, and third filter stripes F1, F2, and F3 are selected with the same combination as in the case of the filter stripes F1, F2, and F3 of the aforementioned color-resolving striped filter which was previously developed. The light-transmitting characteristic of the fourth filter stripe F4, theoretically, may be of any character. However, in the case where this light-transmitting characteristic is the same as that of one of the first, second, and third filter stripes, or where fourth filter stripes F4 which do not transmit light, that is, are black, are used, an output signal of large S/N ratio can be obtained with high efficiency without the occurrence of color demodulation error as described hereinafter.

As one embodiment of the color-resolving striped filter 30, the filter stripes F1, F2, F3, and F4 have respectively light transmitting characteristics for transmitting the lights of green, cyan, white, and white. In the block diagram shown in FIG. 3, in a case where the color-resolving striped filter 30 of the present invention is used instead of the previously developed color-resolving striped filter 10, the output signal of the waveform as shown in FIG. 6 is obtained from the camera tube 14. In FIG. 6, a period T1 shows a signal period determined by width b of each of the filter stripes F1, F2, and F3, while a period T shows one period of the output signal of the camera tube of which interval is determind by width $(3b+3c)$ of one set of the first through fourth filter stripes F1 through F4. Symbols $i_G$, $i_B$, and $i_R$ denote respectively signal levels of green, blue, and red lights. A symbol $i_{PO}$ denotes a level of signal produced responsive to the fourth filter stripe F4.

The output signal obtained from the camera tube 14 provided with the color-resolving striped filter 30 comprises the direct wave signal and high frequency range component signal in which the carrier wave of the space frequency f1 $(=1/T)$ and the harmonics of the carrier wave are amplitude modulated by a signal of mixed color of red and blue color lights. This high frequency range component signal is represented by the following equation in the result that the waveform shown in FIG. 6 is expanded by Fourier series and that signals of third or higher harmonics component are omitted.

$$SH(P) = B\sin(\omega t + \phi) + \cos\left(\pi \frac{T_1}{T}\right) \cdot B\sin(2\omega t - \phi) \quad (4)$$

where $$\begin{cases} B = -\frac{2}{\pi} \sin\left(\pi \frac{T_1}{T}\right) (i_B^2 + i_R \cdot i_B + i_R^2)^{\frac{1}{2}} \\ \phi = \tan^{-1} \frac{i_B - i_R}{\sqrt{3}\,(i_B + i_R)} \\ \omega = 2\pi/T = 2\pi f_1 \end{cases}$$

The high frequency range component signal SH(P) shown by the equation (4) does not include a signal (level) $i_{PO}$ produced responsive to the fourth filter stripe F4. The signal SH(P) is represented by a function consisting of signals (levels) $i_B$ and $i_R$, and the period $T_1$ determined by the width b of each of the first through third filter stripes F1 through F3. Since the fundamental repetitive frequency of the fourth filter stripe F4 is three times the fundamental repetitive frequency of the first through third filter stripes F1 through F3, the signal $i_{PO}$ appears in the third or following terms in the right hand side of the equation (4) which are omitted in the equation (4) as unnecessary terms. The fact that the high frequency range component signal SH(P) does not include the signal $i_{PO}$ means that the fourth filter stripe F4 may have any characteristics for transmitting any lights.

In the signal Sh obtained from the camera tube provided with the previously developed color-resolving striped filter, the ratio of the second harmonic component signal to the fundamental wave component signal is (A/2)/A $(=0.5)$, as clearly known from the equation (3). On the other hand, in the signal SH(P) obtained from the camera tube provided with the color-resolving striped filter of the present invention, the ratio of the second harmonic component signal to the fundamental wave component signal is B cos $(\pi T_1/T)/B$ $(=\cos (\pi T_1/T))$, as known from the equation (4).

Accordingly, in a case where a preamplifier of the Percival type is used for the preamplifier 15, numerical value of cos $(\pi T_1/T)$ should be set at a value of 0.63, in order to increase the ratio of the second harmonic component signal level to the fundamental wave component signal level by 2 dB in comparing with that ratio of the above described signal Sh. The numerical value of $T_1/T$ should be therefore selected at a value of 0.28. In the result that the widths b and c of the filter stripes so that the value of ratio $T_1/T$ is 0.28, the noise component $n_2$ within the range of the second harmonic component signal and the noise component $n_1$ within the range of the fundamental wave component signal become equal to each other, whereby the output three primary color signals of large S/N ratio can be obtained.

It is possible to make the noise component $n_2$ to be smaller than the noise component $n_1$ by selecting the value of the ratio $(T_1/T)$ adequately, whereby the output three primary color signals of larger S/N ratio is obtained.

The high frequency range component signal SH(P) is used for generating (color demodulating) two primary color signals responsive to the two primary color light other than the primary color transmitted through the first filter stripe F1, as described hereinbefore. Since the signal $i_{PO}$ is not included in the signal SH(P), the transmitting characteristic of the fourth filter stripe F4 may be selected at any characteristic.

The equation (4) becomes equal to the equation (3) in a case where the ratio of the second harmonic component signal level to the fundamental wave component signal level of the equation (4), namely, cos $(\pi T_1/T)$ is set at a value 0.5, the ratio of the second harmonic component signal level to the fundamental wave component signal level of the equation (3). In this case, it is sufficient that the value of a coefficient Kp is selected so that the value of cos $(\pi T_1/T)$. Kp becomes 0.5. The value of the coefficient Kp is determined by selecting of the gain of the amplifier. In the embodiment described above, Kp=$(0.5/0.63) \approx 0.8$. Accordingly, the gain of the amplifier may be smaller than unity (1), whereby the noise component becomes smaller as the gain is smaller.

Figure 6:
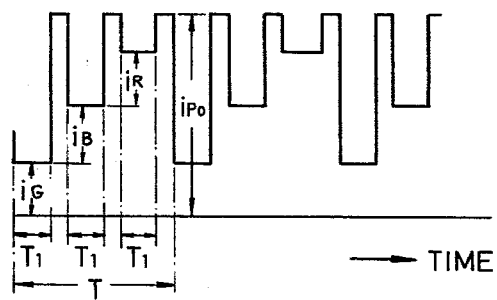
FIG. 6 is a diagram indicating the energy distribution of transmitted light when white light is projected onto the color-resolving striped filter shown in FIG. 5.

On the other hand, the direct wave signal SD(P) obtained in the result that the output signal of the camera tube having the waveform shown in FIG. 6 has passed through the low-pass filter 17 shown in FIG. 3 is represented by the following equation.

$$SD(P) = \frac{3T_1}{T} (i_G + \tfrac{2}{3} i_B + \tfrac{1}{3} i_R) + \frac{T - 3T_1}{T} \cdot i_{PO} \quad (5)$$

Since the equation (5) includes the signal $i_{PO}$, the color demodulation at the matrix circuit 21 is affected directly by the transmitting characteristic of the fourth filter stripe F4. However, in a case where the color of the fourth filter stripe F4 is black, for example, the signal $i_{PO}$ becomes zero, whereby the second term in the right hand side of the equation (5) becomes zero, while the first term thereof including the signals $i_B$ and $i_R$ is not affected. Therefore, the green signal SG is produced with no color demodulation error.

Further, in a case where the fourth filter stripe F4 has a transmitting characteristic same as the transmitting characteristic of the first filter stripe F1, namely, the characteristic for transmitting only the green light, the signal $i_G$ appears instead of the signal $i_{PO}$ in the equation (5). Accordingly, the signals $i_B$ and $i_R$ in the equation (5) are not affected. The green signal SG is therefore produced with no color demodulation error.

Still further, in a case where the transmitting characteristic of the fourth filter stripe F4 is the same as the transmitting characteristic of the second or third filter stripe F2 or F3, the coefficients of the signals $i_B$ and $i_R$ in the equation (5) are differed. However, the two primary color signals of the blue color signal SB and the red color signal SR respectively having no color demodulation error are obtained from the high frequency band component signal SH(P), as described above. Accordingly, the blue color signal SG having no error can be demodulated by selecting adequately the conditions of operation of the matrix circuit 21.

In a case where the transmitting characteristic of the fourth filter stripe F4 is selected to be a transmitting characteristic other than that described above, the same signals as the signals $i_G$, $i_B$ and $i_R$ in the equation (5) are not produced due to the existence of the fourth filter stripe F4, while other signals different from those signals are produced. The obtained green color signal SG accompanies with some errors. In this case, it is preferable to provide a matrix circuit for correcting errors. In a case where the transmitting characteristic of the fourth filter stripe F4 is selected to be black or a characteristic for interrupting white light or to be the same characteristic as any one of the transmitting characteristics of the first through third filter stripes F1 through F3, three primary color signals having no color demodulation error and having large S/N ratio can be obtained easily.

As a modification, the fourth filter stripes F4 may have unequal width different from the width c. Three fourth filter stripes F4 in each group of filter stripes consisting of the first through third filter stripes F1 through F3 and three fourth filter stripes F4 may have widths different from each other.

Further, this invention is not limited to these embodiments but various variations and modifications may be made without departing from the scope of the invention.

What we claim is:

1. A color-resolving striped filter for use in a camera tube, said filter comprising a plurality of groups of filter stripes, said groups being disposed in parallel and consecutively arranged in a repeated sequence, each of said groups consisting of six filter stripes, which comprise:
   a first filter stripe having a light transmission characteristic for transmitting the light of one of the three primary colors of an addition mixture color,
   a second filter stripe having a light transmission characteristic for transmitting the light of a mixed color which includes the primary color transmitted through said first filter stripe and one of the other two primary colors,
   a transparent third filter stripe for transmitting white light, and
   three filter stripes of a fourth light transmitting characteristic, each of said fourth characteristic stripes being disposed between and adjacent to the first, second, and third filter stripes, each of the first, second, and third filter stripes having a first and uniform width and each of the stripes with a fourth characteristic having a second and uniform width which is less than said first width, said six filter stripes of each group being arranged in parallel and consecutively in a specific sequence.

2. A color-resolving striped filter as claimed in claim 1 in which each of the filter stripes having the fourth characteristic has the same light transmitting characteristic as one of the light transmitting characteristics of the first, second, and third filter stripes.

3. A color-resolving striped filter as claimed in claim 1 in which each of said filter stripes having said fourth characteristic has a black color for interrupting white color.

4. A color-resolving striped filter as claimed in claim 1 in which each of said first, second, and third filter stripes has a width b; each of said filter stripes having said fourth characteristic has a width c; and the widths b and c are selected so that $$\frac{b}{3(b+c)} \text{ is } 0.28.$$

5. A color-resolving striped filter positioned in front of a camera tube of a color television signal generating apparatus including the camera tube and a preamplifier for amplifying an output signal of the camera tube, said color-resolving striped filter comprising a plurality of groups of filter stripes, said groups being disposed in parallel and consecutively arranged in a repeated sequence, each of said groups consisting of six filter stripes which comprise:

a first filter stripe having a light transmission characteristic for transmitting the light of one of the three primary colors of an addition mixture color, a second filter stripe having a light transmission characteristic for transmitting the light of a mixed color which includes the primary color transmitted through said first filter stripe and one of the other two primary colors, a transparent third filter stripe for transmitting white light, and three filter stripes having a fourth light transmitting characteristic, each of said stripes with said fourth characteristic being disposed between and adjacent to the first, second, and third filter stripes, fourth filter stripes having a specific light transmission characteristic and being disposed in alternate succession between the first, second, and third filter stripes, the first, second, and third filter stripes having an equal width which is greater than the width of said fourth filter stripes, said six filter stripes of each group being arranged in parallel and consecutively in a specific sequence, said preamplifier comprising a Percival type amplifier, and the gain of said amplifier being 0.8.

* * * * *